United States Patent
Won et al.

(10) Patent No.: US 10,027,933 B2
(45) Date of Patent: Jul. 17, 2018

(54) METHOD AND APPARATUS FOR OUTPUTTING IMAGES

(71) Applicants: SAMSUNG ELECTRONICS CO., LTD., Suwon-si (KR); Research & Business Foundation Sungkyunkwan University, Suwon-si (KR)

(72) Inventors: Kwang-hyun Won, Bucheon-si (KR); Chan-yul Kim, Bucheon-si (KR); Byeung-Woo Jeon, Seongnam-si (KR); Khanh Quoc Dinh, Suwon-si (KR); Young-hyeon Park, Suwon-si (KR); Hiuk-jae Shim, Chuncheon-si (KR); Sun-il Lee, Seoul (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 15/204,355

(22) Filed: Jul. 7, 2016

(65) Prior Publication Data

US 2017/0180683 A1   Jun. 22, 2017

(30) Foreign Application Priority Data

Dec. 22, 2015   (KR) .................. 10-2015-0184078

(51) Int. Cl.
*H04N 9/07* (2006.01)
*H04N 9/09* (2006.01)
(Continued)

(52) U.S. Cl.
CPC .............. *H04N 9/09* (2013.01); *H04N 5/33* (2013.01); *H04N 5/332* (2013.01); *H04N 9/045* (2013.01);
(Continued)

(58) Field of Classification Search
CPC .. H04N 9/09; H04N 9/67; H04N 5/33; H04N 9/76; H04N 9/77
(Continued)

(56) References Cited

U.S. PATENT DOCUMENTS

| | | | |
|---|---|---|---|
| 8,446,470 B2 | 5/2013 | Lu et al. | |
| 2007/0153335 A1* | 7/2007 | Hosaka | H04N 1/58 358/463 |

OTHER PUBLICATIONS

Lu et al: "Designing Color Filter Arrays for the Joint Capture of Visible and Near-Infrared Images", School of Computer and Communication Sciences, Ecole Polytechnique Federale de Lausanne (EPFL), 2009, IEEE, pp. 3797-3800, Switzerland, (4 pages total).

(Continued)

*Primary Examiner* — Yogesh Aggarwal
(74) *Attorney, Agent, or Firm* — Sughrue Mion, PLLC

(57) ABSTRACT

A method and an apparatus for outputting an image by using a color filter array (CFA) sensor are provided. The method includes receiving a 4-channel combination image signal through the CFA sensor, and separating the 4-channel combination image signal into a visible image signal and a near-infrared image signal, based on a signal separation coefficient including a color coefficient that is determined to convert 4-channel color data into 3-channel color data and a weight coefficient that is determined based on a 4-channel signal configured of near-infrared image signals. The method further includes outputting the visible image signal and the near-infrared image signal.

18 Claims, 12 Drawing Sheets

(51) Int. Cl.
| | |
|---|---|
| H04N 5/33 | (2006.01) |
| H04N 9/76 | (2006.01) |
| H04N 9/77 | (2006.01) |
| H04N 9/67 | (2006.01) |
| H04N 9/04 | (2006.01) |

(52) U.S. Cl.
CPC .............. *H04N 9/67* (2013.01); *H04N 9/76* (2013.01); *H04N 9/77* (2013.01)

(58) Field of Classification Search
USPC .................................................. 348/267–273
See application file for complete search history.

(56) References Cited

OTHER PUBLICATIONS

Langfelder et al: "A device and an algorithm for the separation of visible and near infrared signals in a monolithic Silicon sensor", Electronics and Information Technology Department, Politecnico de Milano, Milano, Italy, Hewlett Packard Labs, Palo Alto, CA, Visual Information Processing and Communication II, vol. 7882 pp. 788207-1-788207-9, 2011, (9 pages total).

Koyoma et al: "A Day and Night Vision MOS Imager With Robust Photonic-Crystal-Based RGB-and-IR", IEEE Transactions on Electron Devices, vol. 55, No. 3, Mar. 2008, pp. 754-759 (6 pages total).

Sadeghipoor et al: "A Novel Compressive Sensing Approach to Simultaneously Acquire Color and Near-Infrared Images on a Single Sensor", School of Computer and Communication Sciences, Ecole Polytechnique Federale de Lausanne (EPFL), Lausanne, Switzerland, Harvard School of Engineering and Applied Sciences, Cambridge, MA 01238, USA, ICASSP 2013 (5 pages total).

Lam et al: "Automatic White Balancing in Digital Photography", Taylor & Francis Group, LLC, 2009, pp. 267-294 (28 pages total).

Dickey Kevin: "A Low-Cost Multispectral Camera for Consumer Applications", Rochester Institute of Technology, May 18, 2014, pp. 1-28, (29 pages total).

\* cited by examiner

4-CHANNEL COMBINATION
IMAGE SIGNAL

METHOD AND APPARATUS FOR OUTPUTTING IMAGES

CROSS-REFERENCE TO RELATED APPLICATION

This application claims priority from Korean Patent Application No. 10-2015-0184078, filed on Dec. 22, 2015, in the Korean Intellectual Property Office, the disclosure of which is incorporated herein by reference in its entirety.

BACKGROUND

1. Field

Apparatuses and methods consistent with exemplary embodiments relate to an image outputting apparatus and a method of outputting visible images and near-infrared images by separating visible image signals and near-infrared image signals.

2. Description of the Related Art

Visible images and near-infrared images each include signals in different wavelength ranges. Because the visible images and the near-infrared images are used differently according to their purposes, there have been many efforts to obtain sharp images in each wavelength range. For example, to obtain sharp visible images, an image outputting apparatus may include an infrared ray shielding filter between a lens and an image sensor to shield near-infrared image signals.

Also, according to the related art, two independent sensors and prisms are used to simultaneously obtain visible images and near-infrared images. Therefore, more users want to acquire sharp visible images and near-infrared images by using current apparatuses.

SUMMARY

Exemplary embodiments may address at least the above problems and/or disadvantages and other disadvantages not described above. Also, the exemplary embodiments are not required to overcome the disadvantages described above, and may not overcome any of the problems described above.

Exemplary embodiments provide an image outputting apparatus and a method of separating visible image signals and near-infrared image signals from an image signal in which visible image signals and near-infrared images are combined.

According to an aspect of an exemplary embodiment, there is provided a method of outputting an image, using a color filter array (CFA) sensor, the method including receiving a 4-channel combination image signal through the CFA sensor, and separating the 4-channel combination image signal into a visible image signal and a near-infrared image signal, based on a signal separation coefficient including a color coefficient that is determined to convert 4-channel color data into 3-channel color data and a weight coefficient that is determined based on a 4-channel signal configured of near-infrared image signals. The method further includes outputting the visible image signal and the near-infrared image signal.

The 4-channel combination image signal may include a combination of a 4-channel visible image signal and a 1-channel near-infrared image signal.

The color coefficient may be determined based on a parameter estimation algorithm to convert 4-channel color data into 3-channel color data.

The parameter estimation algorithm may be determined based on least squares estimation at least once.

The weight coefficient may be determined based on calculating respective ratios of channels based on a first channel signal that is selected from 4-channel signals configured of near-infrared image signals.

The method may further include interpolating the 4-channel combination image signal into four color separated combination image signals that include independent color signals.

The method may further include simultaneously outputting a visible image from the visible image signal and a near-infrared image from the near-infrared image signal.

The method may further include performing white balance processing on the visible image signal.

The method may further include calculating a luminance image signal including brightness information of the visible image signal, calculating a luminance average value of the calculated luminance image signal, correcting brightness of the visible image signal based on comparing the luminance average value and a reference luminance average value, and outputting a visible image from the visible image signal of which the brightness is corrected.

The method may further include fusing the near-infrared image signal and the visible image signal to correct the visible image signal.

A non-transitory computer-readable storage medium may store a program including instructions to cause a computer to perform the method.

According to an aspect of an exemplary embodiment, there is provided an apparatus for outputting an image, using a color filter array (CFA) sensor, the apparatus including a signal receiver configured to receive a 4-channel combination image signal through the CFA sensor, and a signal separator configured to separate the 4-channel combination image signal into a visible image signal and a near-infrared image signal, based on a signal separation coefficient including a color coefficient that is determined to convert 4-channel color data into 3-channel color data and a weight coefficient that is determined based on a 4-channel signal configured of near-infrared image signals. The apparatus further includes an image outputter configured to output the visible image signal and the near-infrared image signal.

The 4-channel combination image signal may include a combination of a 4-channel visible image signal and a 1-channel near-infrared image signal.

The color coefficient may be determined based on a parameter estimation algorithm to convert 4-channel color data into 3-channel color data.

The weight coefficient may be determined based on a calculation of respective ratios of channels based on a first channel signal that is selected from 4-channel signals configured of near-infrared image signals.

The apparatus may further include an image interpolator configured to interpolate the 4-channel combination image signal into four color separated combination image signals that include independent color signals.

The image outputter may be further configured to simultaneously output a visible image from the visible image signal and output a near-infrared image from the near-infrared image signal.

The apparatus may further include a white balance processor configured to perform white balance processing on the visible image signal.

The apparatus may further include a luminance calculator configured to calculate a luminance image signal including brightness information of the visible image signal, a luminance average calculator configured to calculate a luminance average value of the calculated luminance image signal, and a brightness corrector configured to correct brightness of the visible image signal based on a comparison of the luminance average value and a reference luminance average value, and output a visible image from the visible image signal of which the brightness is corrected.

The apparatus may further include an image corrector configured to fuse the near-infrared image signal and the visible image signal to correct the visible image signal.

BRIEF DESCRIPTION OF THE DRAWINGS

The above and/or other aspects will be more apparent by describing exemplary embodiments with reference to the accompanying drawings, in which.

DETAILED DESCRIPTION

Figure 1:
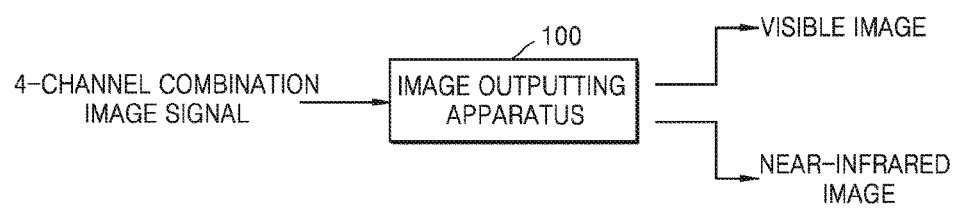
FIG. 1 is a schematic diagram of an image outputting apparatus outputting a visible image and a near-infrared image from a 4-channel combination image signal, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

In addition, the terms such as "unit," "-er (-or)," and "module" described in the specification refer to an element for performing at least one function or operation, and may be implemented in hardware, software, or the combination of hardware and software.

FIG. 1 is a schematic diagram of an image outputting apparatus 100 outputting a visible image and a near-infrared image from a 4-channel combination image signal, according to an exemplary embodiment.

As shown in FIG. 1, the image outputting apparatus 100 may receive a 4-channel combination image signal.

According to an exemplary embodiment, the image outputting apparatus 100 is an example of an apparatus for outputting images by using a color filter array (CFA) sensor. Examples of the image outputting apparatus 100 may include, but is not limited to, computers, personal digital assistants (PDAs), portable multimedia players (PMPs), smartphones, tablet computers, TVs, smart TVs, cameras, video camcorders, and mobile devices.

A color filter may refer to a filter that allows a liquid crystal display device to display colors by extracting colors in pixel units from white light emitted by a bottom light source.

According to an exemplary embodiment, the CFA sensor may include a color filter that transmits light components in the visible spectrum and a near-infrared filter that transmits light components in the near-infrared spectrum of the non-visible spectrum. The CFA sensor may include a color channel that has four channels.

The CFA sensor may indicate a semiconductor device that converts optical images into electric signals. The CFA sensor may be included in, but is not limited to, a complementary metal-oxide semiconductor (CMOS) sensor or a charge-coupled device (CCD) sensor. According to an exemplary embodiment, the CFA sensor may refer to sensors that are generally used in the image outputting apparatus 100.

The CMOS sensor may refer to a switch type sensor that utilizes CMOS technology in which a control circuit and a signal processing circuit are used as peripheral circuits. The switch type sensor may use the CMOS technology to create MOS transistors as much as the number of pixels, and sequentially detect output by using the MOS transistors.

A CCD may be a device in which MOS capacitors are adjacent to one another and charge carriers are stored in and transferred by the MOS capacitors.

According to an exemplary embodiment, the CFA sensor may include a 4-channel CFA. According to an exemplary embodiment, the 4-channel CFA may indicate complementary color filtering. For example, the 4-channel CFA may include a CMYG color filter. CMYG may refer to four colors, including cyan, magenta, yellow, and green. Cyan, magenta, and yellow may include three primary colors, i.e., cyan may include green and blue, magenta may include red and blue, and yellow may include red and green. However, colors in the four channels are not limited to the aforementioned colors.

The image outputting apparatus 100 may receive a 4-channel combination image signal that includes a 4-channel combination image signal in which a 4-channel visible image signal and a 1-channel near-infrared image signal are combined. Also, the received 4-channel combination image signal may include signals received by the image outputting apparatus 100 through a color channel filter. The 4-channel combination image signal may include signals including a 4-channel color signal and a near-infrared image signal.

A visible image signal is light in a wavelength range that is recognizable to the human eye. Physical light is a spectrum within a wavelength range that is recognizable by the human eye as colors, and may indicate electromagnetic waves having wavelengths in the range of about 380 nm to 780 nm. That is, the visible image signal may indicate a wavelength range that is recognizable to the human eye.

When light emitted by the sun or other heat sources is dispersed into a spectrum infrared rays are located outside the edge of the red spectrum. Infrared rays having wavelengths of 0.75 μm to 3 μm are referred to as near-infrared rays. Infrared rays may be used for industrial or medical purposes because infrared rays have a stronger heat effect than visible rays or ultraviolet rays. Also, near-infrared rays include an electronic spectrum and have a photography effect, a photoelectric effect, and a fluorescent effect other than the heat effect. Therefore, photography signs, photoelectric cells, phototubes, and thermocouples may be used for near-infrared ray detection.

The image outputting apparatus 100 according to an exemplary embodiment may be not including an infrared (IR) filter. The IR filter may be a filter for shielding infrared signals. The human eye can only recognize visible rays within a range of electromagnetic waves, i.e., in a range from 380 nm to 770 nm. Also, the human eye can distinguish various colors because of light receiving cells that are sensitive to blue, green, and red. However, a CCD sensor may recognize wavelengths in a wider range than the human eye as light. Therefore, an image, which is photosensed by the image outputting apparatus 100 includes an infrared area with wavelengths of 770 nm or more that is detected as light but invisible to the human eye, may show a different scene from a scene shown through the human eye. Accordingly, in order for the image outputting apparatus 100 to output an image that is the same as an image recognized by a human, the image outputting apparatus 100 may include the IR filter for shielding the infrared signals. However, because the image outputting apparatus 100 according to an exemplary embodiment controls combination image signals received through the CFA sensor, the IR filter may be not included.

The image outputting apparatus 100 may use one CFA sensor without an IR filter to receive a 4-channel combination image signal. The image outputting apparatus 100 may output a visible image and a near-infrared image. The image outputting apparatus 100 may obtain two independent images with different wavelengths by performing an image separation process.

Figure 2:
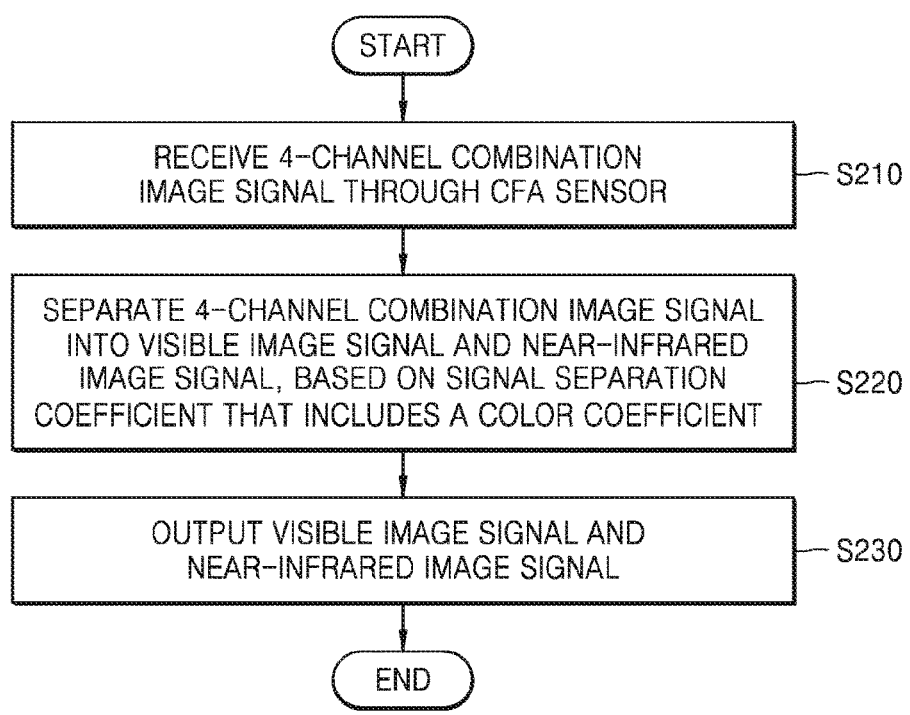
FIG. 2 is a flowchart of a method of outputting a visible image and a near-infrared image, performed by an image outputting apparatus, according to an exemplary embodiment.

FIG. 2 is a flowchart of a method of outputting a visible image and a near-infrared image, performed by the image outputting apparatus 100, according to an exemplary embodiment.

Referring to FIG. 2, the image outputting apparatus 100 may receive a 4-channel combination image signal and separate the 4-channel combination image signal into a visible image signal and a near-infrared image signal.

In operation S210, the image outputting apparatus 100 may receive the 4-channel combination image signal through the CFA sensor.

According to an exemplary embodiment, the CFA sensor may include a CMYG complementary color filter.

The 4-channel combination image signal may refer to an image signal including four visible ray color signals and infrared signals. The four visible ray color signals may include CMYG color signals, but is not limited thereto.

According to an exemplary embodiment, the image outputting apparatus 100 may be not including the IR filter for shielding infrared signals. Also, the image outputting apparatus 100 may be not including a beam-splitter prism for physically separating the infrared signals. Therefore, a size and manufacturing cost of the image outputting apparatus 100 may be reduced.

In operation S220, the outputting apparatus 100 according to an exemplary embodiment image may separate the visible image signal and the near-infrared image signal based on a signal separation coefficient. The signal separation coefficient may include a color coefficient determined to change 4-channel color data into 3-channel color data, and a weight coefficient determined based on a 4-channel signal configured of near-infrared image signals.

According to an exemplary embodiment, the signal separation coefficient may indicate a signal separation matrix including 12 color coefficients and 4 weight coefficients. Equation 1 is an exemplary embodiment showing separation of the visible image signal and the near-infrared image signal by using the signal separation coefficient.

$$\begin{bmatrix} C'(i,j) \\ M'(i,j) \\ Y'(i,j) \\ G'(i,j) \end{bmatrix} = \begin{bmatrix} \alpha_{11} & \alpha_{12} & \alpha_{13} & \omega_1 \\ \alpha_{21} & \alpha_{22} & \alpha_{23} & \omega_2 \\ \alpha_{31} & \alpha_{32} & \alpha_{33} & \omega_3 \\ \alpha_{41} & \alpha_{42} & \alpha_{43} & \omega_4 \end{bmatrix} \begin{bmatrix} R(i,j) \\ G(i,j) \\ B(i,j) \\ NIR(i,j) \end{bmatrix} \quad \text{[Equation 1]}$$

According to an exemplary embodiment, C'(i,j), M'(i,j), Y'(i,j), and G'(i,j) may indicate a ½ color separated combination image signal of a pixel (i,j). For example, C'(i,j) may indicate data obtained by interpolating the near-infrared image signal and a cyan color signal.

In this case, the image outputting apparatus 100 may obtain the color separated combination image signal by receiving the 4-channel combination image signal and separating the image signal into four colors by performing image signal interpolation operations. The color separated combination image signal may indicate a signal in which the near-infrared image signal and color signals (G, M, Y, and C) are combined. This will be described below with reference to FIG. 6.

According to an exemplary embodiment, α11 to α43 may indicate color coefficients. Also, ω1 to ω4 may indicate weight coefficients. The signal separation coefficient according to an exemplary embodiment may be a 4×4 matrix.

According to an exemplary embodiment, R(i,j), G(i,j), and B(i,j) may be (i,j)-th visible image signals that are separated from the 4-channel combination image signal by the image outputting apparatus 100.

According to an exemplary embodiment, NIR(i,j) may be a near-infrared image signal (i,j) that is separated from the 4-channel combination image signal by the image outputting apparatus 100.

Equation 2 is an equation for separating the visible image signal and the near-infrared image signal from the 4-channel combination image signal.

$$\begin{bmatrix} R(i,j) \\ G(i,j) \\ B(i,j) \\ NIR(i,j) \end{bmatrix} = \begin{bmatrix} \alpha_{11} & \alpha_{12} & \alpha_{13} & \omega_1 \\ \alpha_{21} & \alpha_{22} & \alpha_{23} & \omega_2 \\ \alpha_{31} & \alpha_{32} & \alpha_{33} & \omega_3 \\ \alpha_{41} & \alpha_{42} & \alpha_{43} & \omega_4 \end{bmatrix}^{-1} \begin{bmatrix} C'(i,j) \\ M'(i,j) \\ Y'(i,j) \\ G'(i,j) \end{bmatrix} \quad \text{[Equation 2]}$$

As shown in Equation 2, the visible image signal and the near-infrared image signal may be separated based on the product of an inverse matrix of the signal separation coefficient and the color separated combination image signal. In other words, the image outputting apparatus 100 may use Equation 2 to separate the visible image signal and the near-infrared image signal from the color separated combination image signal in which the visible image signal and the near-infrared image signal are combined.

Based on a calculation using Equation 2 according to an exemplary embodiment, the visible image signal that does not include the near-infrared image signal may be separated from the 4-channel combination image signal including the near-infrared image signal. Also, the near-infrared image signal that only includes the near-infrared image signal may be separated.

Equation 3 is for obtaining a color coefficient B in the matrix of signal separation coefficients. Equation 4 is for calculating a color coefficient from sample visible ray data matrices.

$$\underbrace{\begin{bmatrix} C(1,1) & C(i,j) & C(M,N) \\ M(1,1) & M(i,j) & M(M,N) \\ Y(1,1)^{\wedge\wedge\wedge} & Y(i,j)^{\wedge\wedge\wedge} & Y(M,N) \\ G(1,1) & G(i,j) & G(M,N) \end{bmatrix}}_{\text{Sample CMYG Data Matrix A}} = $$ [Equation 3]

$$\underbrace{\begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \\ \alpha_{41} & \alpha_{42} & \alpha_{43} \end{bmatrix}}_{\text{Color Coefficient B}} \underbrace{\begin{bmatrix} R(1,1) & R(i,j) & R(M,N) \\ G(1,1)\ldots & G(i,j)\ldots & G(M,N) \\ B(1,1) & B(i,j) & B(M,N) \end{bmatrix}}_{\text{Sample RGB Data Matrix C}}$$

$A = BC$ [Equation 4]
$B = AC^{-\dagger}$
$C^{-\dagger} : C^T(CC^T)^{-1}$

The color coefficient B is for converting sample 4-channel data into sample 3-channel data. The color coefficient B is used to separate the visible image signal from the 4-channel combination image signal.

Here, the color coefficient B may be determined by applying a parameter estimation algorithm to convert 4-channel color data A into 3-channel color data C.

The parameter estimation algorithm may be determined by performing experiments and a plurality of experiment data calculations to obtain the color coefficient. The parameter estimation algorithm may be an algorithm for obtaining a parameter of 3-channel color data from a plurality of 4-channel color data experiment values.

The parameter estimation algorithm may include a value determined by applying least squares estimation at least once, but is not limited thereto. Least squares estimation is a method of determining a parameter such that the sum of a difference between an observed value and a fitted value is minimized. Least squares estimation may be used to organize past data and predict when to perform various actions in the future. Least squares estimation is performed such that the sum of squared residuals of numbers obtained from data and equations is minimized.

Based on Equation 3, sample 4-channel visible image signal data A is obtained by multiplying a matrix of the color coefficient B to a matrix of sample 3-channel visible ray data C.

Based on Equation 4, the color coefficient B may be obtained by changing rows and columns of an inverse matrix of the sample 3-channel visible ray data C and multiplying a conjugate complex of the inverse matrix of the sample 3-channel visible ray data C to the sample 4-channel visible image signal data A.

For example, changing rows and columns of an inverse matrix may indicate that a value at (1,3) of the inverse matrix is relocated to (3,1) of the inverse matrix, and a value at (3,1) of the inverse matrix is relocated to (1,3) of the inverse matrix.

According to an exemplary embodiment, the sample 4-channel visible image signal data A may indicate pre-estimated sample 4-channel data. Also, the sample 3-channel visible ray data C may indicate pre-estimated sample 3-channel data. The color coefficient B is used to convert the pre-estimated sample 4-channel data into the pre-estimated sample 3-channel data.

According to an exemplary embodiment, a conversion of a CMYG color space into a RGB color space is provided as an example. However, exemplary embodiments are not limited thereto. According to an exemplary embodiment, types of 4-channel color channels and 3-channel color channels are not limited. For example, an XYZ space and a YCbCr space may also be converted in the same manner.

Equations 5 and 6 are for calculating weight coefficients.

$$\mu_{CG} = Average\left(\frac{C}{G}\right),$$ [Equation 5]

$$\mu_{MG} = Average\left(\frac{M}{G}\right),$$

$$\mu_{YG} = Average\left(\frac{Y}{G}\right)$$

$w_1 = \mu_{CG} \times w_4,$ [Equation 6]
$w_2 = \mu_{MG} \times w_4,$
$w_3 = \mu_{YG} \times w_4,$
$w_4 = \beta$ According to an exemplary embodiment, a 4-channel signal that is used to calculate the near-infrared weight coefficient is received by using a CMYG CFA. However, exemplary embodiments are not limited thereto.

C, M, Y, and G signal values used in Equations 5 and 6 may be signal values only included in the near-infrared spectrum. The C, M, Y, and G signal values may be 4-channel image signals that only include a near-infrared image signal without a visible image signal. For example, the C, M, Y, and G signal values may be obtained by projecting only an 850 nm near-infrared LED light source to a CFA. For example, the C, M, Y, and G signal values may be reinforced and each may include reinforced near-infrared (NIR) signals.

According to Equation 5, a ratio of each channel may be calculated based on one channel value. For example, a ratio of C, M, and Y channels with respect to the G signal value may be obtained. According to an exemplary embodiment, $\mu_{CG}$ may be obtained by calculating an average of the G signal value with respect to the C signal value. Also, $\mu_{MG}$ may be obtained by calculating an average of the G signal value with respect to the M signal value, and $\mu_{YG}$ may be obtained by calculating an average of the G signal value with respect to the Y signal value.

According to an exemplary embodiment, the weight coefficients $w_1$ to $w_4$ based on Equation 6. According to an exemplary embodiment, each of the weight coefficients may be calculated based on weight coefficients other than itself. A near-infrared weight coefficient may be used to determine brightness of a near-infrared image.

According to an exemplary embodiment, any one among the weight coefficients $w_1$ to $w_4$ may be set as a reference weight value, and other weight coefficients may be determined based on the reference weight value.

According to an exemplary embodiment, the image outputting apparatus 100 may set $w_4$ as the weight reference value. For example, $w_4$ may be set as, but is not limited to, 1.

In operation S230, the image outputting apparatus 100 may output the separated visible image signal and the separated near-infrared image signal. Also, a visible image may be output from the visible image signal, and a near-infrared image may be output from the near-infrared image signal.

The image outputting apparatus 100 may output the near-infrared image from the near-infrared image signal, and thus determine food decomposition or distinguish a portion of a plant. Because the image outputting apparatus 100 may separate the near-infrared image by calculating equations without a physical device for separating the near-infrared image, the image outputting apparatus 100 may output the near-infrared image with low cost.

The image outputting apparatus 100 may simultaneously output the visible image and the near-infrared image. Because the image outputting apparatus 100 may simultaneously output the visible image and the near-infrared image from the 4-channel combination image signal, correction of a capture angle difference and a time difference between the aforementioned images may be unnecessary.

Figure 3:
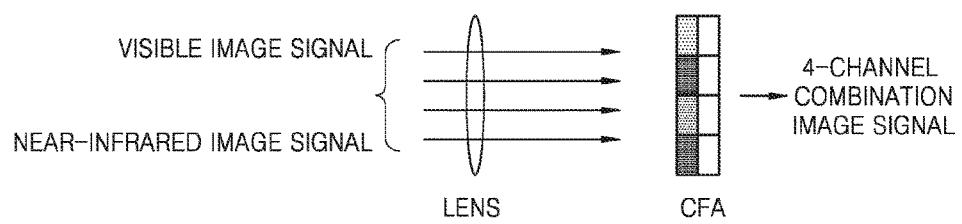
FIG. 3 is a diagram of a color filter array (CFA) that simultaneously receives a visible image signal and a near-infrared image signal, according to an exemplary embodiment.

FIG. 3 is a diagram of a CFA that simultaneously receives a visible image signal and a near-infrared image signal, according to an exemplary embodiment.

According to an exemplary embodiment, the image outputting apparatus 100 may not include an independent sensor that includes an IR filter that shields infrared signals, a half-mirror, and an IR pass filter.

According to an exemplary embodiment, the image outputting apparatus 100 may receive a combination image signal including a near-infrared image signal and a visible image signal through a CFA.

According to an exemplary embodiment, the CFA used in the image outputting apparatus 100 may be included in, but is not limited to, a CMOS sensor or a CCD sensor.

According to an exemplary embodiment, the CFA used in the image outputting apparatus 100 may have a planar shape.

According to an exemplary embodiment, because the image outputting apparatus 100 includes widely used CMOS sensors or CCD sensors, the size and manufacturing cost of the image outputting apparatus 100 may be reduced.

For example, the image outputting apparatus 100 may include, but is not limited to, a CMOS sensor or a CCD sensor, and a CMYG complementary color filter.

Figure 4:
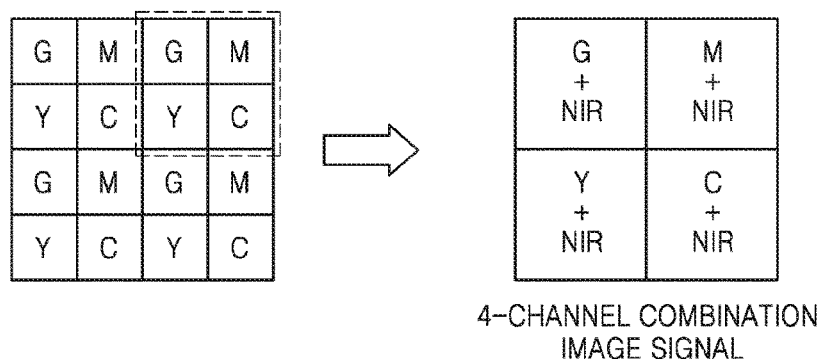
FIG. 4 is a diagram of a 4-channel combination image signal received by an image outputting apparatus, according to an exemplary embodiment.

FIG. 4 is a diagram of a 4-channel combination image signal received by the image outputting apparatus 100, according to an exemplary embodiment.

According to an exemplary embodiment, the image outputting apparatus 100 may receive a 4-channel combination image signal that includes both a near-infrared image signal and a visible image signal. For example, the image outputting apparatus 100 may receive, through a CMOS sensor or a CCD sensor including a 4-channel CFA, the 4-channel combination image signal including the near-infrared image signal and the visible image signal.

According to an exemplary embodiment, the image outputting apparatus 100 may receive the 4-channel combination image signal by using a CMYG complementary color filter. Because the image outputting apparatus 100 does not include an infrared ray shielding filter, the 4-channel combination image signal may include the near-infrared image signal and the visible image signal.

As shown in FIG. 4, the 4-channel combination image signal may be receive through a CFA that includes four 2×2 color channels.

According to an exemplary embodiment, the 4-channel combination image signal may be a signal in which C, M, Y, and G channels are combined with near-infrared signals NIR. The image outputting apparatus 100 may receive the 4-channel combination image signal in which the visible image signal and the near-infrared image signal are combined, and separate the visible image signal and the near-infrared image signal from the 4-channel combination image signal.

Figure 5:
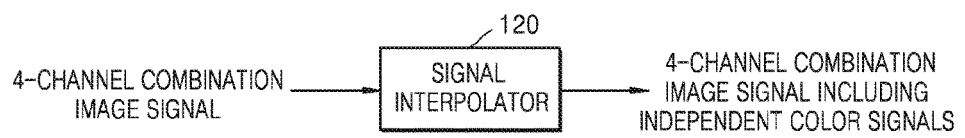
FIG. 5 is a diagram for describing a process of converting a 4-channel combination image into a 4-channel combination image signal including an independent color signal by using a signal interpolator, according to an exemplary embodiment.

FIG. 5 is a diagram for describing a process of converting a 4-channel combination image signal into a 4-channel combination image signal including an independent color signal by using a signal interpolator, according to an exemplary embodiment.

Figure 6:
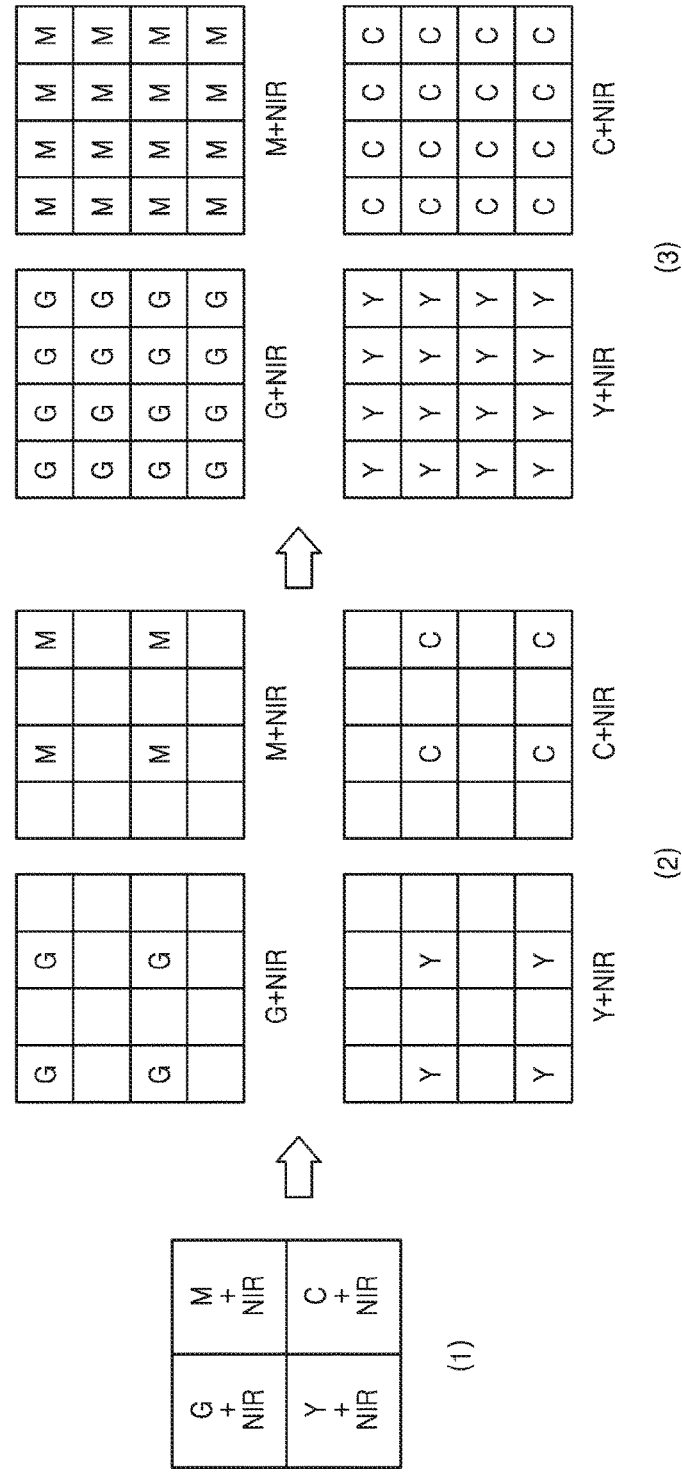
FIG. 6 is a diagram for describing a process of generating a color separated combination image signal by interpolating a 4-channel combination image signal, according to an exemplary embodiment.

FIG. 6 is a diagram for describing a process of generating a color separated combination image signal by interpolating a 4-channel combination image signal, according to an exemplary embodiment.

Hereinafter, a process of interpolating the 4-channel combination image signal will be described with reference to FIGS. 5 and 6. However, the interpolation process is not limited to the description below.

A signal interpolator 120 of the image outputting apparatus 100 may receive the 4-channel combination image signal, and output a color separated combination image signal including four independent combination images by performing the interpolation process.

According to an exemplary embodiment, the image outputting apparatus 100 may include a CFA that includes a CMYG complementary color filter. Here, the image outputting apparatus 100 may interpolate the 4-channel combination image signal that passed through the CFA because the image outputting apparatus 100 may not be able to detect colors of light that are not represented by a pixel but represented by the CFA. The interpolation process of the signal interpolator 120 may be performed before signal separation, i.e., before the 4-channel combination image is input to a signal separator 130.

According to an exemplary embodiment, (1) of FIG. 6 shows the 4-channel combination image signal passed through the CFA, (2) of FIG. 6 shows an intermediate operation for interpolating the 4-channel combination image signal, (3) of FIG. 6 shows a color separated combination image signal that is interpolated.

The 4-channel combination image signal in (1) of FIG. 6 may include G+NIR, M+NIR, Y+NIR, and C+NIR channels.

By performing interpolation, as shown in (2) of FIG. 6, the image outputting apparatus 100 may separate G+NIR, M+NIR, Y+NIR, and C+NIR into independent signals. For example, in a G+NIR signal, only G color signals including NIR signals may be independently separated from 4-channel combined image signals.

The image outputting apparatus 100 may generate color separated combination image signals by using separate independent signals. According to an exemplary embodiment, the image outputting apparatus 100 may perform interpolation on G+NIR, M+NIR, Y+NIR, and C+NIR signals. For example, the outputting apparatus 100 may fill pixels that do not represent a G color in an independently separated G+NIR signal by determining an average light amount of a pixel that represents the G color and another pixel. The CMOS sensor may include four pixels in a group. Pixels in a first group may respectively be in charge of G+NIR, M+NIR, Y+NIR, and C+NIR signals. Accordingly, G, M, Y, and C color pixels including infrared signals are included in the first group. That is, in a 24 megapixel sensor, 6 million pixels may represent only the G color, another 6 million pixels may represent only the M color, another 6 million pixels may represent only the Y color, and the remaining 6 million pixels may represent only the C color. An image signal may be interpolated by randomly adding an omitted color.

After such interpolation, the color separated combination image signals including independent color signals may be obtained, as shown in (3) of FIG. 6.

The interpolation performed by the image outputting apparatus 100 may include, for example, bilinear interpolation. Bilinear interpolation is a color interpolation method that uses a relationship between a pixel representing a color and an amount of light around the pixel. Alternatively, the image outputting apparatus 100 may perform an improved bilinear interpolation method that does not decrease resolution as in a bilinear interpolation method of the related art.

According to an exemplary embodiment, the image outputting apparatus 100 may perform any type of interpolation methods that may calculate respective amount of light of G, M, Y, and C color pixels.

The image outputting apparatus 100 may separate the visible image signal and the near-infrared image signal by calculating a signal separation coefficient that includes color coefficients and weight coefficients of interpolated color separated combination image signals.

Figure 7:
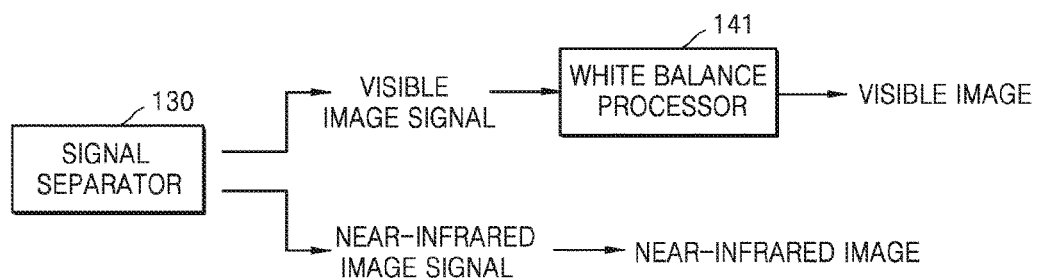
FIG. 7 is a diagram for describing performing white balance processing on a visible image signal, according to an exemplary embodiment.

FIG. 7 is a diagram for describing performing of white balance processing on a visible image signal, according to an exemplary embodiment.

As shown in FIG. 7, a 4-channel combination image signal is separated by a signal separator 130 into a visible image signal and a near-infrared image signal. The signal separator 130 may output a 3-channel visible image signal and a 1-channel near-infrared image signal from the 4-channel combination image signal.

Because the visible image signal is separated from a signal combined with the near-infrared image signal, a visible image may be slightly red. Because the image outputting apparatus 100 does not include an IR filter or a hot mirror for shielding near-infrared rays, the visible image may be affected by the near-infrared image signal and thus be output in a red color.

A white balance processor 141 may perform white balance processing on the visible image signal and output a visible image with less red color. Currently known white balance processing methods may be used, but exemplary embodiments are not limited thereto.

For example, the white balance processor 141 may perform white balance processing by using a grey world algorithm as shown in Equation 7, but is not limited thereto.

$$R_{AWB}(i, j) = \frac{G_{avg}}{R_{avg}} R(i, j), G_{AWB}(i, j) = G(i, j),$$ [Equation 7]

-continued
$$B_{AWB}(i, j) = \frac{G_{avg}}{B_{avg}} B(i, j)$$

$$R_{avg} = \frac{1}{MN} \sum_{i=1}^{M} \sum_{j=1}^{N} R(i, j) \quad G_{avg} = \frac{1}{MN} \sum_{i=1}^{M} \sum_{j=1}^{N} G(i, j)$$

$$B_{avg} = \frac{1}{MN} \sum_{i=1}^{M} \sum_{j=1}^{N} B(i, j)$$

In Equation 7, R(i,j), G(i,j), and B(i,j) may be visible image signals separated by the signal separator 130 and input to the white balance processor 141. That is, R(i,j), G(i,j), and B(i,j) may be visible image signals that are not white-balanced.

$R_{AWB}(i,j)$, $G_{AWB}(i,j)$, and $B_{AWB}(i,j)$ may be visible image signals R(i,j), G(i,j), and B(i,j) that are white-balanced.

The white balance processor 141 may adjust color balance such that a color of a white object captured under a random light source is observed in the same color as a white object captured under sunlight.

Figure 8:
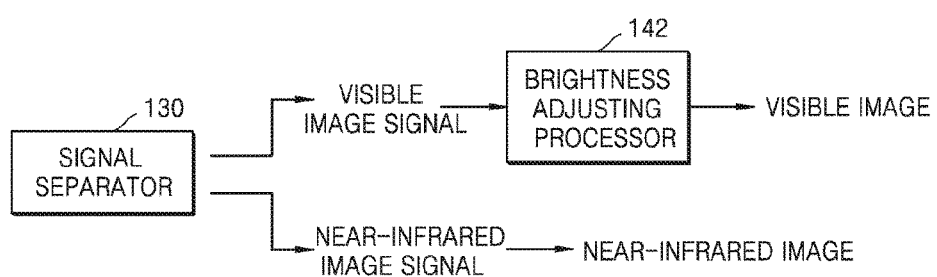
FIGS. 8 and 9 are diagrams for describing a process of performing brightness adjustment on a visible image signal, according to an exemplary embodiment.
Figure 9:
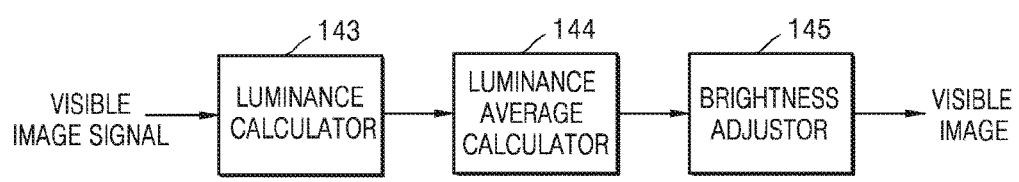

FIGS. 8 and 9 are diagrams for describing a process of performing brightness adjustment on a visible image signal, according to an exemplary embodiment.

As shown in FIG. 7, a 4-channel combination image signal may pass through the signal separator 130 and be separated into a visible image signal and a near-infrared image signal. The signal separator 130 may output a 3-channel visible image signal and a 1-channel near-infrared image signal from the 4-channel combination image signal.

The image outputting apparatus 100 may output a visible image from the 3-channel visible image signal, and a near-infrared image from the 1-channel near-infrared image signal. In this case, the visible image may be output with a brightness that is lower than a preset reference.

A brightness adjusting processor 142 may receive the visible image and change the brightness of the visible image to a preset brightness. The image outputting apparatus 100 may calculate a luminance of the visible image signal, calculate an average luminance, compare the average luminance to a preset luminance, correct the brightness, and thus output a relatively more natural image.

According to an exemplary embodiment, an image signal input to the brightness adjusting processor 142 may include a white-balanced visible image signal.

According to an exemplary embodiment, the brightness adjusting processor 142 may include a luminance calculator 143, a luminance average calculator 144, and a brightness adjustor 145.

The luminance calculator 143 may calculate a luminance image including image brightness information from the visible image signal. The luminance image may be calculated by using, but is not limited to, a YCbCr calculation method.

The luminance refers to an intensity of light of a light source having a range divided by an area of the light source, and may indicate brightness of the light source. The luminance may vary according to wavelengths, and may be related to the sensitivity of the human eye.

The luminance average calculator 144 may calculate an average of the luminance image calculated by the luminance calculator 143.

The brightness adjustor 145 may compare the calculated average of the luminance image and a preset average of the luminance image, correct the brightness of the visible image, and output the visible image. The brightness adjustor 145 may change the brightness of the visible image based on a ratio between the preset average of the luminance image and the average of the luminance image calculated by the luminance average calculator 144.

According to an exemplary embodiment, the image outputting apparatus 100 may improve a color of a dark portion of the visible image that is output by the brightness adjusting processor 142.

The image outputting apparatus 100 may reduce noise and enhance color information of pixels of the brightness adjusted visible image, the pixels of which brightness is difficult to improve.

According to an exemplary embodiment, the image outputting apparatus 100 may calculate an average value of blocks of i-th and j-th pixels of each of R(i,j), G(i,j), and B(i,j) signals in the brightness adjusted visible image.

When the calculated average value of the blocks is greater than a preset average value of the blocks, the image outputting apparatus 100 may determine the calculated average value of the blocks as a pixel value to improve image quality. When the calculated average value of the blocks is smaller than a preset average value of the blocks, the image outputting apparatus 100 may determine, among all blocks, k blocks with relatively high pixel values. The image outputting apparatus 100 may determine an average value of the k blocks as the pixel value, and thus improve the image quality.

Figure 10:
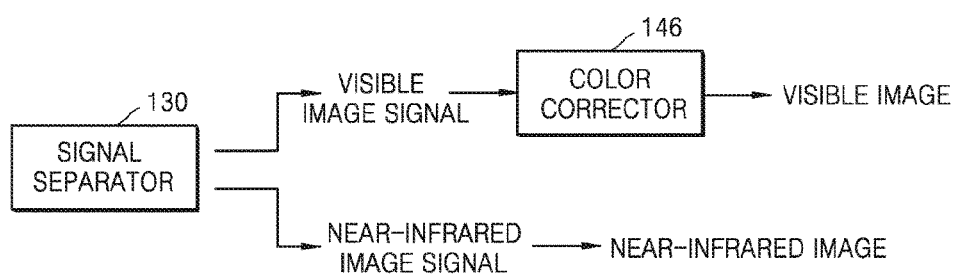
FIG. 10 is a diagram for describing a process of performing color correction on a visible image signal, according to an exemplary embodiment.

FIG. 10 is a diagram for describing a process of performing color correction on a visible image signal, according to an exemplary embodiment.

As shown in FIG. 10, a 4-channel combination image signal may be separated into a visible image signal and a near-infrared image signal by the signal separator 130. The signal separator 130 may output a 3-channel visible image signal and a 1-channel near-infrared image signal from the 4-channel combination image signal.

According to an exemplary embodiment, an image signal input to a color corrector 146 may include a white-balanced visible image signal. According to an exemplary embodiment, the image signal input to the color corrector 146 may include a brightness adjusted visible image signal.

The color corrector 146 may compare the visible image signal to the 4-channel combination image signal in an initial stage and thus correct colors and brightness of the visible image.

The color corrector 146 may receive the 4-channel combination image signal, and calculate a luminance and a chrominance image of the 4-channel combination image signal. Also, the color corrector 146 may receive the visible image signal, and calculate a luminance and a chrominance image of the visible image signal.

Here, color different calculation and luminance calculation may be performed based on a method of calculating a YCbCr sample, but are not limited thereto.

Also, the color corrector 146 may compare the luminance of the 4-channel combination image signal and the luminance of the visible image signal, and thus correct a brightness of the visible image signal.

Also, the color corrector 146 may compare an average of the chrominance image of the 4-channel combination image signal and an average of the chrominance image of the visible image signal. Accordingly, the image outputting apparatus 100 may output a visible image with improved chrominance and brightness.

Figure 11:
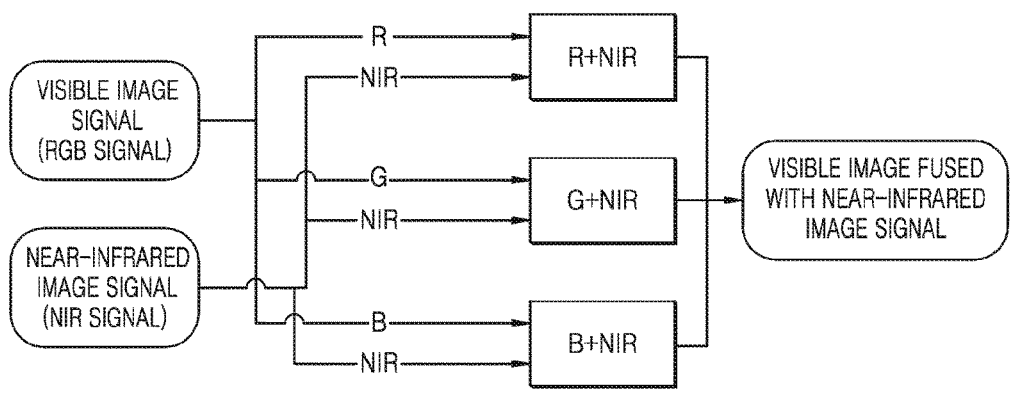
FIG. 11 is a diagram for describing a process of outputting a visible image by fusing a visible image signal and a near-infrared image signal, according to an exemplary embodiment.

FIG. 11 is a diagram for describing a process of outputting a visible image by fusing a visible image signal and a near-infrared image signal, according to an exemplary embodiment.

The image outputting apparatus 100 may fuse a near-infrared image signal and a visible image signal to output a sharp visible image from a 4-channel combination image signal that is input when illuminance is low.

According to an exemplary embodiment, the image outputting apparatus 100 may perform image fusion by adding a near-infrared image signal NIR to visible image signals R, G, and B that are separated from the 4-channel combination image signal. According to an exemplary embodiment, the image outputting apparatus 100 may perform image fusion by combining identical near-infrared signals and R, G, and B pixels. An image fusion method is not limited to the aforementioned exemplary embodiments.

When the visible image signals R, G, and B and the near-infrared image signal NIR are fused, a pixel difference between the visible image signals R, G, and B may decrease, and thus chroma of a visible image may decrease.

Accordingly, the visible image signal may be output by near-infrared pixels with respect to a size proportion of each of the R, G, and B pixels.

According to an exemplary embodiment, an RGB image and a near-infrared image may be fused as in Equation 8.

$$\begin{pmatrix} R' \\ G' \\ B' \end{pmatrix} = \begin{pmatrix} 1+k & 0 & 0 \\ 0 & 1+k & 0 \\ 0 & 0 & 1+k \end{pmatrix} \cdot \begin{pmatrix} R \\ G \\ B \end{pmatrix}$$ [Equation 8]

K in Equation 8 is as below.

$$K = \frac{3N}{R+G+B}$$

According to an exemplary embodiment, when the RGB image and the near-infrared image are fused as in Equation 8, an I' (intensity of light) of the image is as below in Equation 9.

$$I'=(R'+G'+B')/3=I+N$$ [Equation 9]

In Equation 9, 'I' may represent brightness of the RGB image and satisfy I=(R+G+B)/3, and 'N' may represent brightness of the near-infrared image.

According to an exemplary embodiment, an image obtained by fusing the RGB image and the near-infrared image according to Equation 8 may have the same brightness as images fused according to the related art, and chroma of original images may be maintained.

According to an exemplary embodiment, when the RGB image and the near-infrared image are fused, brightness and sensitivity of colors may be adjusted according to image properties or an image application field.

According to an exemplary embodiment, the RGB image and the near-infrared image may be fused based on Equation 10.

$$R'=N*(1-\alpha)*R/(R+G+B)+N*\alpha$$

$$G'=N*(1-\alpha)*G/(R+G+B)+N*\alpha$$

$$B'=N*(1-\alpha)*B/(R+G+B)+N*\alpha$$ [Equation 10]

An $\alpha$ value in Equation 10 satisfies $0 \leq \alpha \leq 1$.

According to an exemplary embodiment, based on Equation 10, in a day mode, an image may be output by decreasing the α value and increasing values of R, G, and B pixels, and in a night mode, a black and white image may be output by increasing the α value and using near-infrared pixel information so that sensitivity of the visible image is improved.

In addition, local or global properties of a 4-channel combination image signal may be analyzed to adjust the α value so that sensitivity of colors or brightness are adjusted.

The α value may be determined based on brightness statistics of an area in the visible image or a constant value. Alternatively, the user may determine the α value according to personally desired conditions of the visible image. For example, the user may increase the α value when a large amount of near-infrared image information is to be acquired, and decrease the α value when a large amount of RGB image information is to be acquired.

According to the α value, the image outputting apparatus 100 may fuse the RGB image and the near-infrared image as in Equation 10 and output a final visible image. Equation 10 shows an example of adjusting a ratio of fusing the visible image signal (RGB image signal) and the near-infrared image signal (NIR image signal) according to image properties. Exemplary embodiments may be variously modified.

Figure 12:
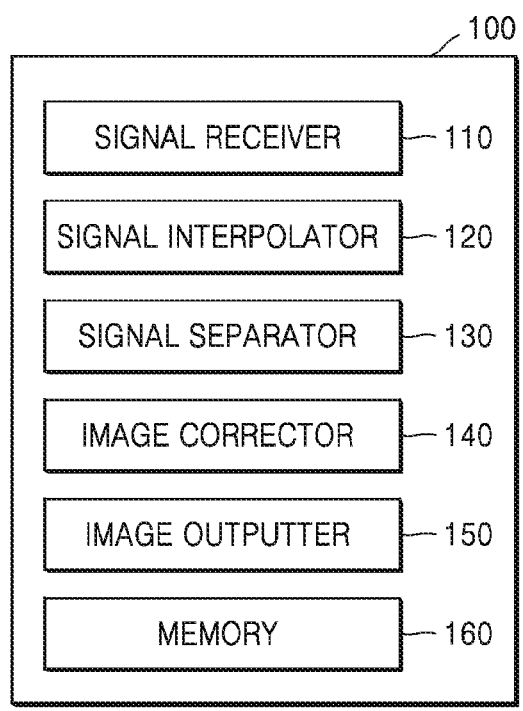
FIG. 12 is a block diagram of an image outputting apparatus according to an exemplary embodiment.

FIG. 12 is a block diagram of the image outputting apparatus 100 according to an exemplary embodiment.

Referring to FIG. 12, the image outputting apparatus 100 may include a signal receiver 110, a signal interpolator 120, a signal separator 130, an image corrector 140, an image outputter 150, and a memory 160.

The signal receiver 110 may receive a 4-channel combination image signal in which a visible image signal and a near-infrared image signal are combined. The signal receiver 110 may include a CMOS sensor or a CCD sensor including a. The signal receiver 110 may include a sensor for receiving a 4-channel color signal. For example, the signal receiver 110 may include, but is not limited to, a CMOS sensor or a CCD sensor and a CMYG complementary color filter to receive the 4-channel color signal.

The signal receiver 110 may be not including an IR filter for shielding infrared signals. Also, the signal receiver 110 may be not including a beam-splitter prism for physically separating the infrared signals. Therefore, a size and manufacturing cost of the image outputting apparatus 100 may be reduced.

The signal interpolator 120 may interpolate pixels through which light is not transmitted in a signal received by the signal receiver 110. Interpolation may also be referred to as demosaicing. Interpolation may include, when the 4-channel combination image signal is input, separating information of each color channel into independent image signals, and filling remaining empty pixel spaces. For example, bilinear interpolation may be used as an interpolation method, but exemplary embodiments are not limited thereto.

By performing interpolation, the signal interpolator 120 may convert the 4-channel combination image signal into a color separated 4-channel combination image signal.

The signal separator 130 may receive the color separated 4-channel combination image signal from the signal interpolator 120. The signal separator 130 may separate the color separated 4-channel combination image signal into a 4-channel visible image signal and a 1-channel near-infrared image signal.

The signal separator 130 may separate the color separated 4-channel combination image signal into a visible image signal and a near-infrared image signal based on a signal separation coefficient. The signal separation coefficient may include a color coefficient for converting channel color data into 3-channel color data and a weight coefficient determined based on a 4-channel signal configured of near-infrared image signals.

According to an exemplary embodiment, the signal separation coefficient may indicate a signal separation matrix that includes 12 color coefficients and 4 weight coefficient.

The signal separator 130 may separate the visible image signal and the near-infrared image signal by using a product of an inverse matrix of the signal separation coefficient and the color separated combination image signal.

The image corrector 140 may correct an image of the visible image signal and an image of the near-infrared image signal. The image corrector 140 may improve a visible image by performing white balance processing on the visible image signal, correcting brightness, correcting chrominance, calculating luminance, and fusing the visible image signal and the near-infrared image signal.

The image corrector 140 may correct an image by using image correction methods of the related art. The image corrector 140 may use various image correction methods, and is not limited to a method.

The image corrector 140 may include the white balance processor 141, the brightness adjusting processor 142, and the color corrector 146.

Also, the image corrector 140 may fuse the near-infrared image signal with the visible image signal to correct the visible image signal that is input in a low illuminance state and separated. The image corrector 140 may perform image fusion by adding a near-infrared image signal NIR to each of visible image signals R, G, and B that are separated from the 4-channel combination image signal. According to an exemplary embodiment, the image corrector 140 may perform image fusion by identical near-infrared signals and R, G, and B pixels. An image fusion method is not limited to the aforementioned exemplary embodiments.

The image outputter 150 may separate and output a visible image and a near-infrared image. The image outputter 150 may simultaneously output the visible image and the near-infrared image.

The memory 160 may store the 4-channel combination image signal that is input, and the visible image and the near-infrared image that are separated. The memory 160 may include a memory card (e.g., a micro SD card, a USB memory device) equipped in the image outputting apparatus 100 according to an exemplary embodiment. Also, the memory 160 may include a non-volatile memory device, a volatile memory device, a hard disk drive (HDD), or a solid state drive (SSD).

According to an exemplary embodiment, a combination image signal that is input via a single sensor may be separated by using software, and thus, a size and manufacturing cost of hardware may be reduced.

According to an exemplary embodiment, brightness and colors of a separated visible image signal may be corrected to output a more vivid visible image signal.

According to an exemplary embodiment, by fusing a separated visible image signal and a separated near-infrared image signal, even in a low luminance situation due to fog or smoke, a clear visible image signal may be obtained because of the near-infrared image signal.

According to an exemplary embodiment, because a near-infrared image may be easily obtained by using currently provided devices, near-infrared images may be used in various fields such as detection of food corruption and dangerous items.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of outputting an image, using a color filter array (CFA) sensor, the method comprising:
    receiving a 4-channel combination image signal through the CFA sensor;
    separating the 4-channel combination image signal into a visible image signal and a near-infrared image signal, based on a signal separation coefficient comprising a color coefficient that is determined to convert 4-channel color data into 3-channel color data and a weight coefficient that is determined based on a 4-channel signal configured of near-infrared image signals; and
    outputting the visible image signal and the near-infrared image signal,
    wherein the color coefficient is determined based on a parameter estimation algorithm to convert 4-channel color data into 3-channel color data.

2. The method of claim 1, wherein the 4-channel combination image signal comprises a combination of a 4-channel visible image signal and a 1-channel near-infrared image signal.

3. The method of claim 1, wherein the parameter estimation algorithm is determined based on least squares estimation at least once.

4. The method of claim 1, wherein the weight coefficient is determined based on calculating respective ratios of channels based on a first channel signal that is selected from 4-channel signals configured of near-infrared image signals.

5. The method of claim 1, further comprising interpolating the 4-channel combination image signal into four color separated combination image signals that comprise independent color signals.

6. The method of claim 1, further comprising simultaneously outputting a visible image from the visible image signal and a near-infrared image from the near-infrared image signal.

7. The method of claim 1, further comprising performing white balance processing on the visible image signal.

8. The method of claim 1, further comprising:
    calculating a luminance image signal comprising brightness information of the visible image signal;
    calculating a luminance average value of the calculated luminance image signal;
    correcting brightness of the visible image signal based on comparing the luminance average value and a reference luminance average value; and
    outputting a visible image from the visible image signal of which the brightness is corrected.

9. The method of claim 1, further comprising fusing the near-infrared image signal and the visible image signal to correct the visible image signal.

10. A non-transitory computer-readable storage medium storing a program comprising instructions to cause a computer to perform the method of claim 1.

11. An apparatus for outputting an image, using a color filter array (CFA) sensor, the apparatus comprising:
    a signal receiver configured to receive a 4-channel combination image signal through the CFA sensor;
    a signal separator configured to separate the 4-channel combination image signal into a visible image signal and a near-infrared image signal, based on a signal separation coefficient comprising a color coefficient that is determined to convert 4-channel color data into 3-channel color data and a weight coefficient that is determined based on a 4-channel signal configured of near-infrared image signals; and
    an image outputter configured to output the visible image signal and the near-infrared image signal,
    wherein the color coefficient is determined based on a parameter estimation algorithm to convert 4-channel color data into 3-channel color data.

12. The apparatus of claim 11, wherein the 4-channel combination image signal comprises a combination of a 4-channel visible image signal and a 1-channel near-infrared image signal.

13. The apparatus of claim 11, wherein the weight coefficient is determined based on a calculation of respective ratios of channels based on a first channel signal that is selected from 4-channel signals configured of near-infrared image signals.

14. The apparatus of claim 11, further comprising an image interpolator configured to interpolate the 4-channel combination image signal into four color separated combination image signals that comprise independent color signals.

15. The apparatus of claim 11, wherein the image outputter is further configured to simultaneously output a visible image from the visible image signal and output a near-infrared image from the near-infrared image signal.

16. The apparatus of claim 11, further comprising a white balance processor configured to perform white balance processing on the visible image signal.

17. The apparatus of claim 11, further comprising a brightness corrector configured to:
    calculate a luminance image signal comprising brightness information of the visible image signal;
    calculate a luminance average value of the calculated luminance image signal; and
    correct brightness of the visible image signal based on a comparison of the luminance average value and a reference luminance average value, and output a visible image from the visible image signal of which the brightness is corrected.

18. The apparatus of claim 11, further comprising an image corrector configured to fuse the near-infrared image signal and the visible image signal to correct the visible image signal.

* * * * *